United States Patent
Jack et al.

(10) Patent No.: US 7,884,508 B2
(45) Date of Patent: Feb. 8, 2011

(54) LINEAR MOTOR

(75) Inventors: Alan Jack, Hexham (GB); Lars-Olov Pennander, Helsingborg (SE); Philip George Dickinson, Cramlington (GB)

(73) Assignee: Höganäs AB, Höganäs (SE)

( * ) Notice: Subject to any disclaimer, the term of this patent is extended or adjusted under 35 U.S.C. 154(b) by 0 days.

(21) Appl. No.: 12/119,321

(22) Filed: May 12, 2008

(65) Prior Publication Data

US 2008/0211324 A1    Sep. 4, 2008

Related U.S. Application Data

(62) Division of application No. 10/792,803, filed on Mar. 5, 2004, now Pat. No. 7,378,763.

(60) Provisional application No. 60/476,196, filed on Jun. 6, 2003.

(30) Foreign Application Priority Data

Mar. 10, 2003   (SE) .................................. 0300657

(51) Int. Cl.
*H02K 41/00* (2006.01)
(52) U.S. Cl. ........................................ 310/12
(58) Field of Classification Search ............... 310/12, 310/14, 15
See application file for complete search history.

(56) References Cited

U.S. PATENT DOCUMENTS

| 276,274 | A | 4/1883 | Peck et al. |
| 3,504,320 | A | 3/1970 | Enghadl et al. |

(Continued)

FOREIGN PATENT DOCUMENTS

EP    0 915 553    5/1999

(Continued)

OTHER PUBLICATIONS

Z & D Limited web page (www.z-d.co.uk); Registration Certificate for Domain Name; p. 1-11.

(Continued)

*Primary Examiner*—Nguyen N Hanh
(74) *Attorney, Agent, or Firm*—Buchanan Ingersoll & Rooney PC

(57) ABSTRACT

A linear motor comprising a stator core and/or a mover. The stator core of said linear motor comprising an inner perimeter, an outer perimeter essentially encircling the inner perimeter, a first and a second tooth being arranged along one of the inner perimeter or the outer perimeter, a slot for receiving a stator coil, said slot being a cavity arranged within the stator core, wherein said stator core is divided into a first stator part and a second stator part, said first stator part including the first tooth, being arranged to partially define the slot, and being made of soft magnetic powder, and said second stator part including the second tooth, being arranged to partially define the slot, and being made of soft magnetic powder. The mover of said linear motor comprising at least one section of soft magnetic material and at least one permanent magnet, the at least one section of soft magnetic material and the at least one permanent magnet being aligned in an axial direction of the mover, wherein a polarization vector of said at least one permanent magnet is directed axially.

10 Claims, 13 Drawing Sheets

U.S. PATENT DOCUMENTS

| | | | |
|---|---|---|---|
| 4,067,667 A | | 1/1978 | White |
| 4,210,831 A | | 7/1980 | Hurst |
| 4,454,426 A | | 6/1984 | Benson |
| 4,761,960 A | | 8/1988 | Higham et al. |
| 4,870,306 A | * | 9/1989 | Petersen .................... 310/12 |
| 4,924,675 A | | 5/1990 | Higham et al. |
| 5,318,412 A | | 6/1994 | Laskaris |
| 5,434,549 A | * | 7/1995 | Hirabayashi et al. ........ 335/229 |
| 5,691,582 A | | 11/1997 | Lucas et al. |
| 5,947,155 A | * | 9/1999 | Miki et al. ............ 137/625.65 |
| 6,060,810 A | | 5/2000 | Lee et al. |
| 6,289,575 B1 | | 9/2001 | Hollingsworth et al. |
| 6,380,832 B2 | | 4/2002 | Oyama et al. |
| 6,573,624 B2 | | 6/2003 | Park |
| 6,603,224 B1 | | 8/2003 | Hollingsworth et al. |
| 6,628,018 B2 | | 9/2003 | Song et al. |
| 6,651,309 B2 | | 11/2003 | Gay et al. |
| 6,755,627 B2 | | 6/2004 | Chang |
| 6,784,782 B2 | | 8/2004 | Inoue et al. |
| 6,809,434 B1 | | 10/2004 | Duncan et al. |
| 6,849,970 B2 | | 2/2005 | Watanabe |
| 6,856,051 B2 | | 2/2005 | Reiter et al. |
| 6,914,351 B2 | | 7/2005 | Chertok |
| 7,075,203 B2 | * | 7/2006 | Kuwert ................. 310/156.13 |
| 2001/0042983 A1 | | 11/2001 | Kinoshita |
| 2002/0117907 A1 | * | 8/2002 | Gay et al. .................... 310/44 |
| 2003/0160521 A1 | | 8/2003 | Park et al. |
| 2003/0201691 A1 | * | 10/2003 | Yamamoto et al. .......... 310/261 |
| 2004/0025325 A1 | | 2/2004 | Kawano |
| 2005/0006971 A1 | | 1/2005 | Lindberg et al. |
| 2006/0108878 A1 | | 5/2006 | Lindberg et al. |

FOREIGN PATENT DOCUMENTS

| | | |
|---|---|---|
| GB | 2 299 715 B | 10/1996 |
| JP | A-06-026457 | 2/1994 |
| JP | A-10-164806 | 6/1998 |
| JP | A-2001-352747 | 12/2001 |
| JP | A-2002-238237 | 8/2002 |
| JP | 2002-291220 | 10/2002 |
| WO | WO 99/18649 | 4/1999 |
| WO | WO 00/69047 | 11/2000 |
| WO | WO 02/27898 A1 | 4/2002 |

OTHER PUBLICATIONS

Miscellaneous Documents (9 pages), an e-mail with attachments dated May 16, 2007, including a part of a 2-page facsimile dated Feb. 25, 1999; a drawing dated May 6, 1999; a purchase order dated May 10, 1999; a package list with a shipping date of Jun. 10, 1999 and an invoice Aug. 6, 1999.

English translation of Japanese Official Action for corresponding Japanese Patent Application No. 2006-507952, issued May 28, 2010 (mailing date: Jun. 1, 2010).

* cited by examiner

Section A-A

Section A-A

Section A-A

Section A-A

Section A-A

Section A-A

LINEAR MOTOR

This application claims benefit of Swedish Patent Application No. 0300657-4, filed Mar. 10, 2003, U.S. Provisional Application No. 60/476,196, filed on Jun. 6, 2003, and is a divisional of U.S. patent application Ser. No. 10/792,803, filed on Mar. 5, 2004, which is now U.S. Pat. No. 7,378,763, and incorporates these applications by reference in their entireties.

TECHNICAL FIELD OF THE INVENTION

The present invention relates to a linear motor, and in particular to a linear motor, a stator core of a linear motor, and a mover of a linear motor.

BACKGROUND OF THE INVENTION

In general, soft magnetic components, also known as cores, of electrical motors and machines are made of insulated thin sheets of soft magnetic materials, e.g. iron or electrical steel. These insulated thin sheets of soft electrical material are also known as laminations. Cores are made of laminations in order to reduce the appearance of eddy currents and, thus, increase the efficiency of the electrical motors and machines.

In linear motors having ring shaped stator cores and tubular movers, wherein a mover is the portion of the linear motor that is to be moved by means of interaction with a magnetic field of a stator, each metal sheet is arranged in radial and axial plane in order to minimize the effect of eddy currents.

In some linear motors metal sheets are stacked together in parallel forming a core portion which is arranged so that one metal sheet is in the radial axial plane and the others are parallel to that one.

One problem with stator cores made as described above is that the coil has to be wound into a slot of the stator core. This is especially troublesome when the opening of the slot is arranged at an inner circumferential surface of the stator core.

Further, the linear motors utilizing the above mentioned techniques are not efficient in regard of the ratio of produced force to the total spatial volume of the linear motor, i.e. produced force/spatial volume.

Accordingly, there is a need for linear motors producing a specific force but with a smaller spatial volume and for stators that is easier to provide with coils.

In U.S. Pat. No. 6,060,810 there is presented a stator for a linear motor, said stator having staggered core lamination. The stator includes a stator coil that is wound in a cylindrical shape and L-shaped lamination sheets having one horizontal unit and one vertical unit. The horizontal unit of a plurality of lamination sheets are alternately laminated in a radial shape on the upper and lower surfaces, thus forming a cylindrical shape.

When building such a stator there is no need to wind the coil through an opening to the slot of the stator core. However, it may be complicated to build the stator core on to the coil.

Further, a stator core according to U.S. Pat. No. 6,060,810 is still not really efficient when it comes to the ratio of produced force to the spatial volume of the motor.

SUMMARY OF THE INVENTION

It is an object of the present invention to provide means for improving linear motors.

This object is accomplished by means of a stator core according to claim 1, by means of a mover according to claim 9, by means of a linear motor according to claim 16, and a stator core according to claim 18. Preferred embodiments of the invention are disclosed in the dependent claims.

In particular, according to one aspect of the invention, a stator core for a linear motor comprises an inner perimeter, an outer perimeter essentially encircling the inner perimeter, a first and a second tooth being arranged along one of the inner perimeter or the outer perimeter, a slot for receiving a stator coil, said slot being a cavity arranged within the stator core, wherein said stator core is divided into a first stator part and a second stator part, said first stator part including the first tooth, being arranged to partially define the slot, and being made of soft magnetic powder, and said second stator part including the second tooth, being arranged to partially define the slot, and being made of soft magnetic powder.

By dividing the stator core into two stator parts each including a tooth, the arranging of a coil in the stator core may be facilitated, because the coil may easily be provided in the first of the stator parts while the stator parts are separated and then the second stator part may easily be arranged in close contact with the first stator part in order to complete a stator or a stator section. This embodiment may allow the use of pre-wound coils, which easily may be arranged in the stator core when the stator core is divided as prescribed by the claimed invention. Accordingly the manufacturing of stators may be facilitated.

Additionally, by making the stator parts of soft magnetic powder the stator parts may be easily manufactured, even if the stator parts are to be formed into intricate shapes, and the stator parts may be made robust. Further, if necessary, stator parts of soft magnetic powder may easily be machined with high precision. Accordingly, the use of soft magnetic powder and the division into two separate stator parts in accordance with the above mentioned may facilitate the assembling of the stator. The assembling of the stator may be facilitated further if each of the two stator parts is a homogenous body of soft magnetic powder.

Another advantage of making the stator parts of soft magnetic powder is that the ratio of the produced force of a motor including the stator to the total spatial volume of said motor may be increased. In particular may the fill factor of the stator be increased. The fill factor being defined as the ratio of spatial volume of active material to the total spatial volume. The reason for this is that the soft magnetic powder may be formed to provide relative high magnetic flux permeance throughout the entire stator core. This relatively high magnetic flux permeance may even be provided across adjoining edges of parts being arranged in close contact, because of the possibility to form the parts with high precision. Laminated stator cores are only able to provide high permeance within each sheet of laminate and when laminates are to be arranged in an axial and radial plane to form a body having an outer perimeter and an inner perimeter there will be a great deal of space in which no soft magnetic material is present. Said space is often filled with low permeability substance, e.g. air or some filling material. However, by making stator cores of soft magnetic powder the magnetic flux is not limited to a "flux channel" having a constant width, but may flow more freely (for the laminate said width correspond to the thickness of each sheet of laminate). Accordingly, more of the total volume of the stator may be used to transport magnetic flux and, thus, a higher fill factor may be reached, i.e. the stator and, thus, the motor may be made small.

According to one embodiment of the stator, the first tooth extends a distance in an axial direction towards the second stator part, said distance being varied along one of the inner perimeter or the outer perimeter of the stator core, and wherein the second stator part extends a distance in an axial direction towards the first stator part, said distance being varied along one of the inner perimeter or the outer perimeter of the stator core.

By introducing said variation in the distance that the tooth of each stator part extends axially at different positions along said perimeter an effect similar to skew in rotational motors may be achieved. Accordingly, the presence of force ripple in a linear motor provided with this stator design may be decreased. The teeth may be provided at an outer perimeter or at an inner perimeter of the stator depending on whether an intended mover for the motor that is to be provided with the stator is to be arranged outside the stator, i.e. at the outer perimeter of the stator, or inside the stator, i.e. at the inner perimeter of the stator.

In one embodiment the first tooth and the second tooth are arranged in close contact with one another. The radial extension of the portions of the teeth that are in close contact is of such small size that the contact area between the teeth become magnetically saturated during operation. By positioning the teeth in contact with each other the assembly of the two stator parts may be more stable and by making the contact area saturate during the operation the flux leakage via the contact area may be kept low.

According to another embodiment said first stator part and said second stator part each includes at least two sections of soft magnetic powder, said sections being arranged adjacent to each other in a direction corresponding to a direction of said inner and outer perimeter. This embodiment may facilitate the production of large stators.

According to one embodiment the density of each of the stator parts is at least 6500 kg/m$^3$. This may result in stator parts having good magnetic properties at the same time as the soft magnetic powder makes them easy to form. Specially, the flux path may not necessary be two dimensional, as in the case of the laminated cores.

According to yet another embodiment the resistivity within each of said stator parts is at least 1 μΩm. Thus, decreasing negative effects resulting from eddy currents.

In one embodiment, each of the first stator part and the second stator part are arranged to be in close contact with each other at the outer perimeter and to be separated from each other at the inner perimeter, the separation at the inner perimeter resulting in a slot opening, between the first and second tooth, leading into the slot. The arranging of coils in an embodiment like this may be facilitated.

In an alternative embodiment, each of the first stator part and the second stator part are arranged to be in close contact with each other at the inner perimeter and to be separated from each other at the outer perimeter, the separation at the outer perimeter resulting in a slot opening, between the first and second tooth, leading into the slot.

According to another aspect of the invention a mover for a linear motor comprises at least one section of soft magnetic material and at least one permanent magnet, said at least one section of soft magnetic material and said at least one permanent magnet being aligned in an axial direction of the mover, wherein a polarization vector of said at least one permanent magnet is directed axially.

In the context of the invention the axial direction is the direction of movement for either the mover or the stator, depending of which of them that is to move in relation to the other.

By arranging said at least one permanent magnet, having an axially directed polarization vector, in axial alignment with one at least one section of soft magnetic material, a robust mover may be achieved. Further, the manufacturing of the permanent magnets that may be used in such a mover may be facilitated, because the ratio of the axial length of the permanent magnet to the width of the permanent magnet may be small in relation to permanent magnets normally used in movers.

In one embodiment the invention is a stator core for a linear motor comprising an inner perimeter, an outer perimeter essentially encircling the inner perimeter, a first and a second tooth being arranged along one of the inner perimeter or the outer perimeter, a slot for receiving a stator coil, said slot being a cavity arranged within the stator core, wherein said stator core is divided into a first stator part and a second stator part, said first stator part including the first tooth, being arranged to partially define the slot, and being made of soft magnetic powder, and said second stator part including the second tooth, being arranged to partially define the slot, and being made of soft magnetic powder, wherein the first tooth and the second tooth are arranged in close contact with each other and wherein the extension of the teeth is small in the radial direction in the area of the contact between the two teeth in order to reach magnetic saturation in this portion of the stator during operation.

In one embodiment the soft magnetic section of the body is made of soft magnetic powder. In this way the manufacturing of the soft magnetic section may be facilitated and the fill factor of the move may be increased.

In another embodiment the mover comprises at least two permanent magnets, a first permanent magnet and a second permanent magnet, that are aligned in said axial direction and wherein the distance between the axial center of said at least two permanent magnets is 0.75-1.5 times the pitch of a prospective stator. By designing the mover like this it may become more efficient.

According to a further embodiment the mover is tubular.

According to yet another embodiment, the at least one section of soft magnetic material is provided with at least a first axial end having an end surface and wherein said at least one permanent magnet is arranged in contact with essentially the entire end surface of the first axial end. In accordance with this embodiment the contact surface between said at least one section of soft magnetic material and said at least one permanent magnet is large and, thus, the mover may become more effective.

In one embodiment a circumferentially and axially extending surface of said at least one permanent magnet is arranged essentially flush with a circumferentially and axially extending surface of the mover that is arranged to face an intended stator.

According to another aspect of the invention a linear motor comprises a stator core according to any one of the embodiments of the stator core mentioned above Such a linear motor may, accordingly, present the same advantages as the particular embodiment of the stator core.

According to another embodiment of the linear motor the linear motor further comprises a mover according any one of the embodiments of the mover mentioned above. Such a linear motor may, accordingly, present the same advantages as the particular embodiment of the mover.

According to yet another aspect of the invention a stator core for a linear motor comprises a stator core, wherein said ring is divided into at least two ring shaped stator parts, a first stator part and a second stator part, and wherein said stator parts are homogenous bodies made of soft magnetic powder.

In the context of the invention the ring shaped stator core and stator parts do not need to be circular, but may be of any shape. For example, the ring shaped stator core and stator parts may be of a triangular shape, a quadratic shape, a rectangular shape, an elliptic shape, a shape that resembles the digit eight, etc.

An advantage of this aspect of the invention may be that the division of the ring shaped stator core into two ring shaped stator parts may result in a design facilitating the production of a stator in which the stator core is a part. Further the stator core may be easily manufactured and may present a high fill factor.

In one embodiment of this stator core the stator core further comprises a slot for receiving a stator coil, said slot being a cavity arranged within the stator core, wherein said slot being partially defined by the first stator part and partially defined by the second stator part.

In yet another embodiment of the stator core the first stator part includes a first tooth and the second stator part includes a second tooth, said first and second tooth being arranged along one of an inner perimeter or an outer perimeter of the ring shaped stator core.

In another embodiment the stator core for a linear motor comprises a ring shaped stator core, wherein said ring is divided into at least two ring shaped stator parts, a first stator part having a first tooth and a second stator part having a second tooth, wherein said stator parts are homogenous bodies made of soft magnetic powder; and a slot for receiving a stator coil, said slot being a cavity arranged within the stator core, wherein said slot being partially defined by the first stator part and partially defined by the second stator part, wherein the first tooth and the second tooth are arranged in close contact with each other and wherein the extension of the teeth is small in the radial direction in the area of the contact between the two teeth in order to reach magnetic saturation in this portion of the stator during operation.

Further, this stator core may include the features of the earlier presented stator core.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which FIG. 15b is a cross-sectional view along line A-A in FIG. 15a.

DETAILED DESCRIPTION OF EMBODIMENTS

Figure 1A:
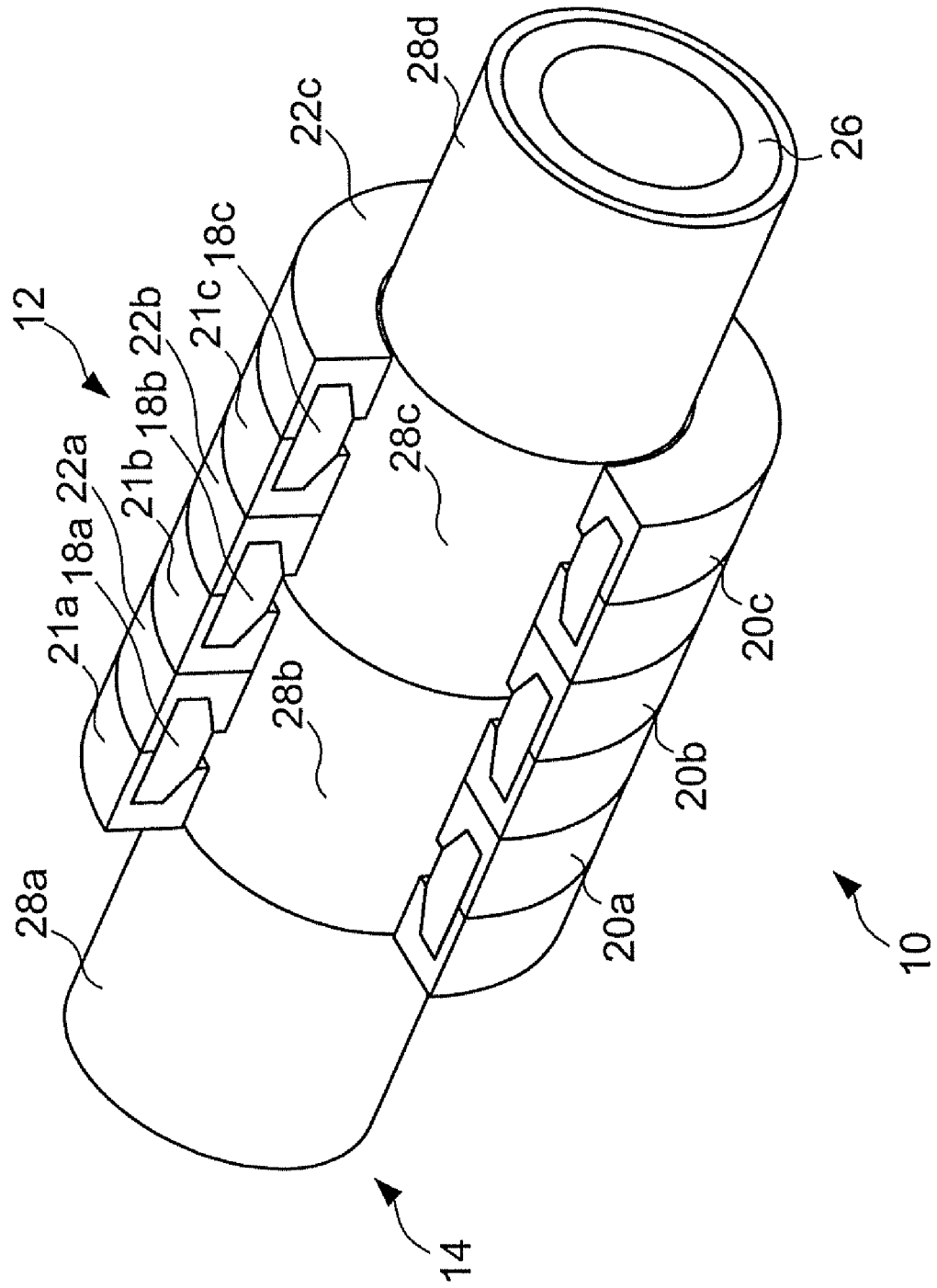
FIG. 1a is a perspective view of a linear motor and a stator core according to one embodiment of the invention.
Figure 1C:
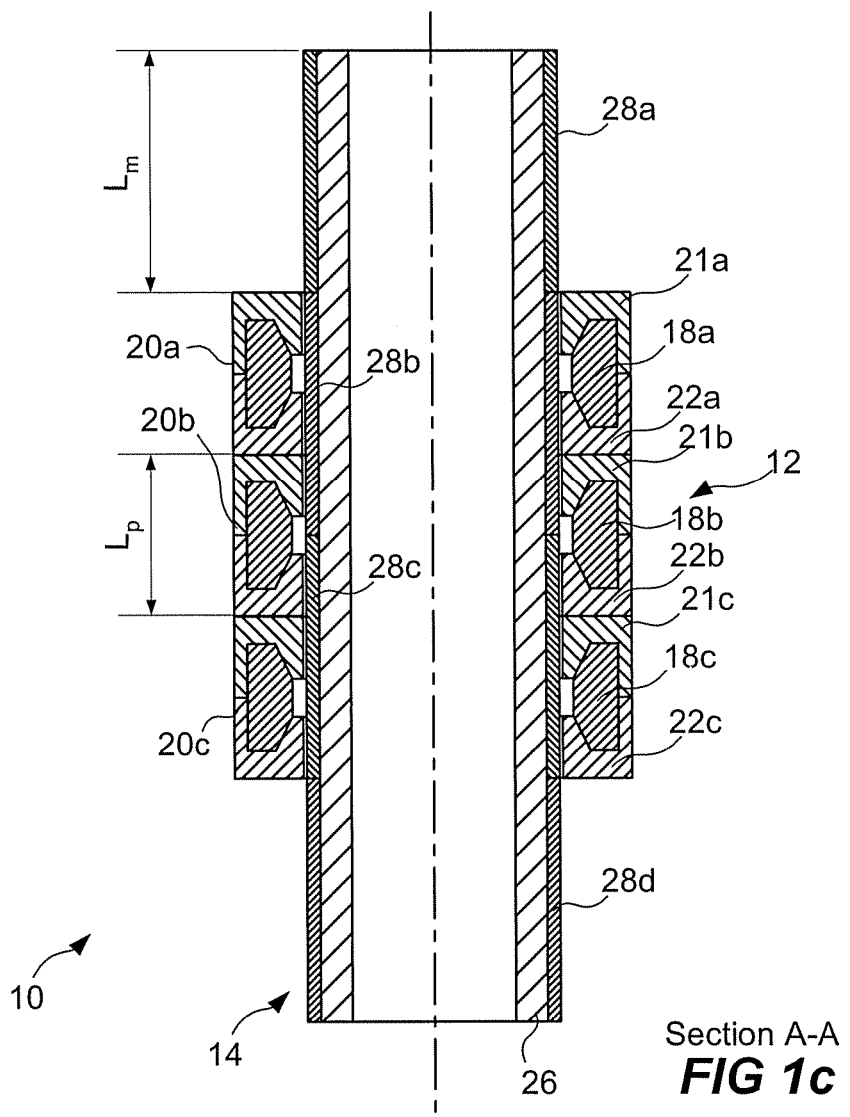
FIG. 1b is a view in an axial direction of the linear motor of FIG. 1a, FIG. 1c is a cross-sectional view along line A-A in FIG. 1b of the linear motor of FIG. 1a, FIG. 2a is a view in an axial direction of a linear motor and a stator core according to another embodiment of the invention.
Figure 1B:
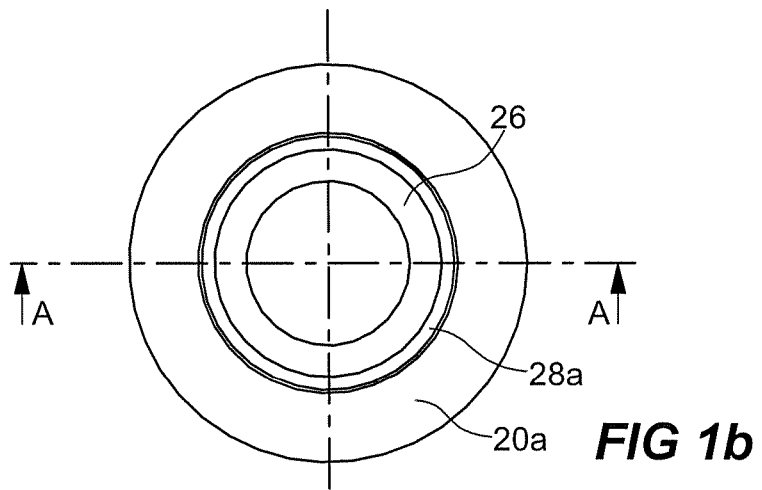

In FIGS. 1a-c a schematic view of a linear motor according to one embodiment is-presented. The linear motor 10, includes a stator 12 and a mover 14. Normally the stator is stationary and drives the mover in an axial direction, however, it is possible to make the mover stationary and make the stator drive itself in an axial direction. Accordingly, in the context of the invention the axial direction is the direction of movement for either the mover or the stator, depending of which of them that is to move in relation to the other.

The stator includes at least one coil 18a-c and at least one stator core 20a-c. A stator coil may be a single winding, i.e. one wire wound into a coil and connected to an electrical supply unit, not shown, or a distributed winding, i.e. each stator coil includes wires that are connected to different outputs of the supply unit and may thereby carry electricity having differing electrical characteristics. A person skilled in the art of electrical motors know many different types of electrical supply units which may be utilized. The skilled person also knows how to connect a single winding or a distributed winding to such electrical supply units.

The purpose of the stator coils is to generate magnetic flux that are to interact with the mover. The stator cores 20a-c are arranged in close proximity to the stator coils 18a-c, the stator coils 18a-c may even be essentially enclosed by the stator cores 20a-c, as shown in the embodiment in FIGS. 1a-c.

According to the embodiment in FIGS. 1a-c each stator core 20a-c is divided into two stator parts 21a-c and 22a-c. Each stator core 20a-c in FIGS. 1a-c, 2a-b, and 3a-b is made of one first stator part 21a-c and one second stator part 22a-c, which are axially stacked onto one another. In a linear motor having a plurality of stator cores 20a-c, as the one in FIGS. 1-3, the stator part of one stator being arranged in close connection to a stator part of another stator core may be made as one single part, i.e. the stator parts 22a and 21b may be made as one single part and the stator parts 22b and 21c may be made as one single part, this will be described later.

Different ways of dividing stators 20a-c into two stator pairs 21a-c and 22a-c and different designs of stators 20a-c will be described below.

The stator parts 21a-c and 22a-c are made of soft magnetic material provided with electrical resistance in order to reduce the appearance of eddy currents. In order to achieve the electrical resistance the material used may be electrically insulated soft magnetic powder, soft magnetic powder presenting electrical resistance, or a moldable soft magnetic material presenting electrical resistance. When using electrically insulated soft magnetic powder, soft magnetic powder presenting electrical resistance, or a moldable soft magnetic material presenting electrical resistance, the manufactured stator parts, according to one embodiment, have to present a resistivity of at least 1 μΩm in order to reduce the appearance of eddy currents satisfactorily. Further, in a stator made of laminated sheets it may be difficult to achieve a high fill factor, this may, however, be accomplished by means of soft magnetic powder. According to one embodiment, each of the stator parts is made as one homogeneous piece of soft magnetic powder. In such stator parts the magnetic flux is not constrained to the two dimensional geometry of the laminates, but may utilize the three dimensional shape of the stator parts in order to decrease the dimensions without saturating the stator core. According to one embodiment the soft magnetic powder may be compacted or sintered to the desired shape, depending on the soft magnetic material used, as long as the resulting stator parts present a resistivity of at least 1 μΩm. Further, according to another embodiment the density of the stator parts may be at least 6500 kg/m$^3$. Some examples of soft magnetic powders that may be used in order to make stator parts by means of compacting are Somaloy 500, Somaloy 550 and Permite 75 from Hoganas AB, S-263 83 Hoganas, Sweden.

Normally, the mover 14 is the part of the linear motor that is to be moved, in relation to the stator, and, thus, may generate tangible effects outside the linear motor 10. The mover 14 interacts with the magnetic field generated by the stator 12 and is, thus, driven by the stator 12. The mover 14 may include a tube 26 of a soft magnetic material. The soft magnetic material may be of any of the qualities and/or types mentioned in connection with the stator cores 20a-c above. Further, a plurality of magnetic tubes 28a-d are mounted onto the tube 26. Each magnetic tube being a permanent magnet having its polarization vector directed radially, i.e. one pole of the permanent magnet facing radially outwards and one pole of the permanent magnet facing radially inwards. For example, the magnetic tubes 28a-c in FIGS. 1a-c may be arranged like this: magnetic tube 28a having its north pole facing outwards and its south pole facing inwards, magnetic tube 28b having its south pole facing outwards and its north pole facing inwards, magnetic tube 28c having its north pole facing outwards and its south pole facing inwards, and magnetic tube 28d having its south pole facing outwards and its north pole facing inwards. The magnetic tubes 28a-d may be fastened to the tube 26 in any way known to a person skilled in the art.

The axial length of the mover may be different from the length presented in FIG. 1 and the number of magnetic tubes may also be different. The axial length of the magnetic tubes 28a-d and the number of magnetic tubes 28a-d may vary and may depend on the application in which the linear motor 10 is to be used. According to one embodiment, the axial length $L_m$ of each magnetic tube 28a-d may be 0.75-1.5 of the pitch $L_p$ between the center of two consecutive teeth of the stator, i.e. the relation $L_m/L_p$ may be 0.75-1.5. In the context of this application the pitch may be seen as the axial distance between the center lines of two adjacent teeth.

Figure 2B:
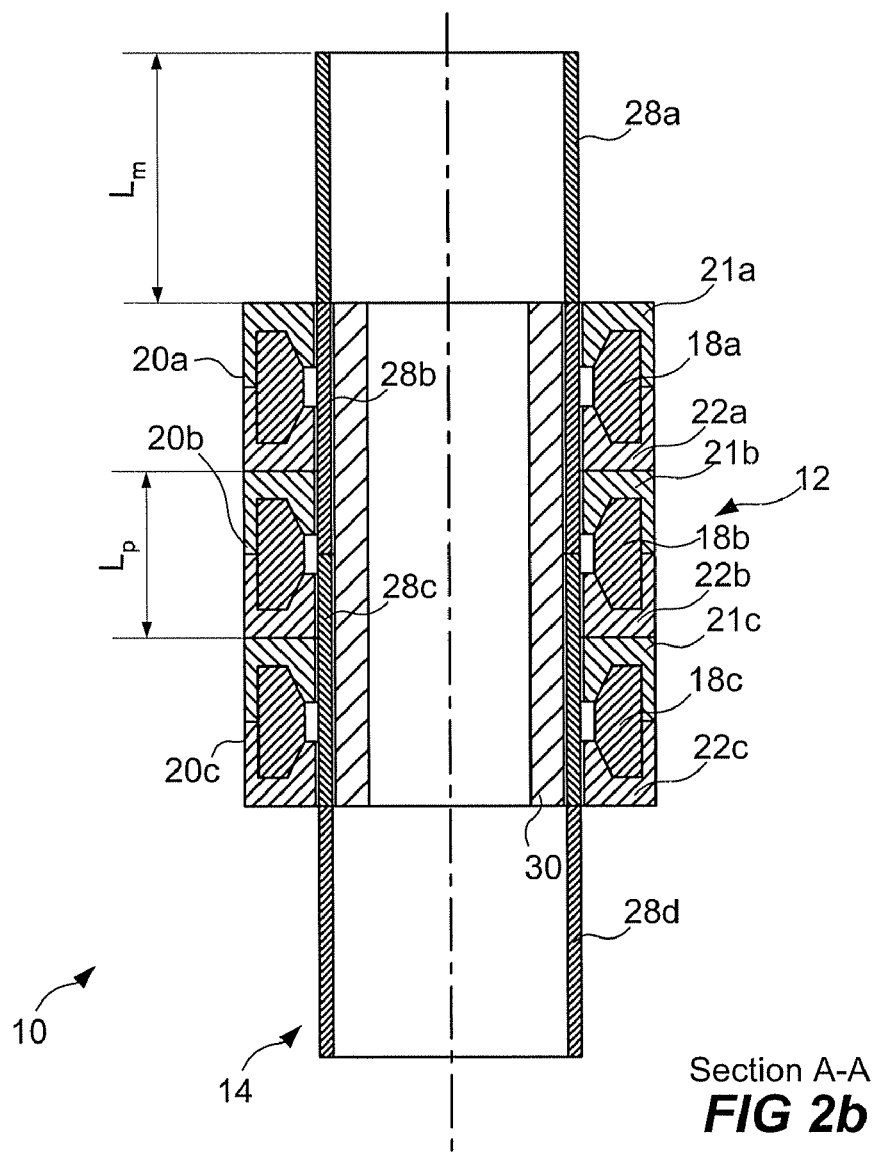
FIG. 2b is a cross-sectional view along line A-A in FIG. 2a, FIG. 3a is a view in an axial direction of a linear motor, a stator core, and a mover according to yet another embodiment of the invention.
Figure 2A:
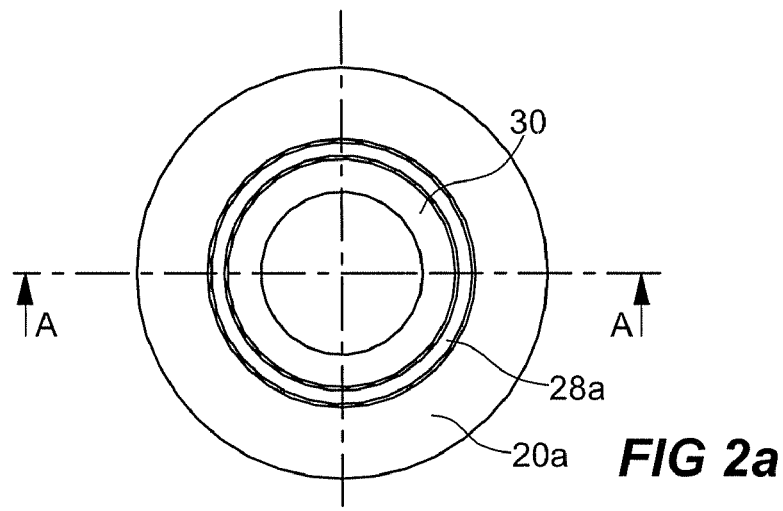

In FIGS. 2a-b another embodiment of a linear motor is shown. This embodiment is similar to the embodiment of FIGS. 1a-c and the differences will be illustrated below.

The stator 12 of the linear motor 10 includes an additional part, an inner stator part 30. The inner stator part 30 may be a tube that is positioned inside the stator parts 21a-c and 22a-c, leaving a space between an outer perimeter of the inner stator part 30 and an inner perimeter of the stator parts 21a-c and 22a-c. The function of the inner stator part is to act as a part in a magnetic circuit which the stator parts 21a-c and 22a-c also are part of. The inner stator part 30 may be made of the same soft magnetic material and by using the same technique as the rest of the stator, which is described above. The inner stator part is arranged to keep its position in relation to the stator parts 21a-c and 22a-c.

Further, the mover is of a different design than the mover of FIGS. 1a-c. The mover of the embodiment in FIGS. 2a-b is made of magnetic tubes 28a-d only. These magnetic tubes are also permanent magnets, as in the embodiment in FIGS. 1a-c, and they may be arranged to have their polarization vectors directed in direction corresponding to the direction of the polarization vectors of the permanent magnets presented in connection with FIGS. 1a-c. In this way the mover may be made lighter than the mover in FIGS. 1a-c, however, as a consequence the mover becomes more fragile, especially at the connection between two magnetic tubes 28a-d. The relation $L_m/L_p$ may be the same as for the embodiment showed in FIGS. 1a-c.

Figure 3B:
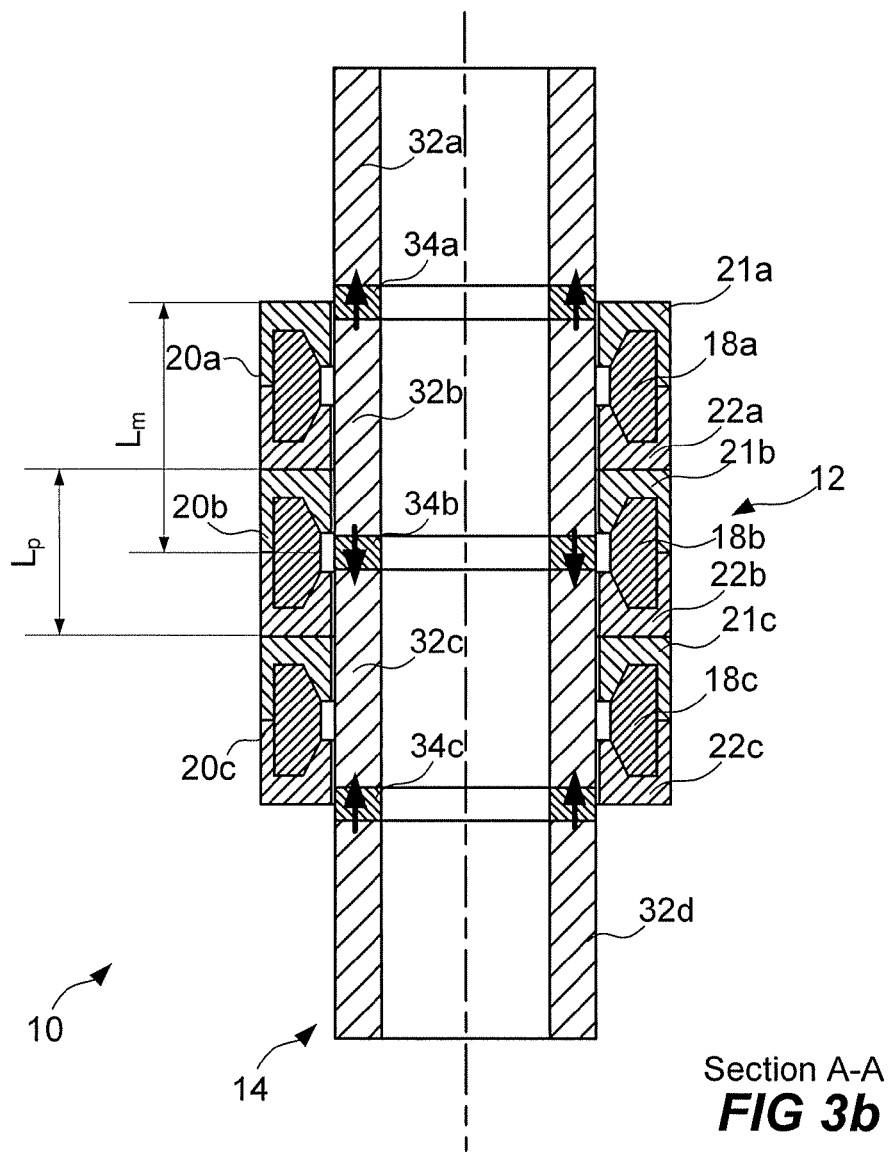
FIG. 3b is a cross-sectional view along line A-A in FIG. 3a, FIG. 4a is a view in an axial direction of a linear motor, a stator core, and a mover according to yet another embodiment of the invention.
Figure 3A:
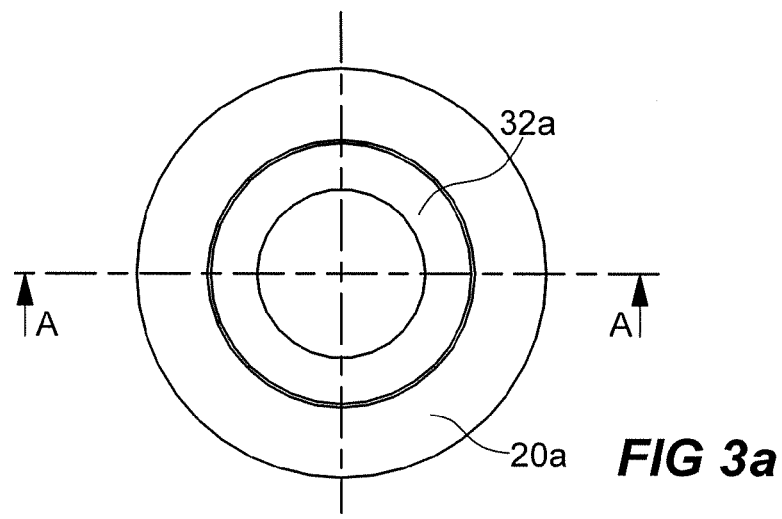

In FIGS. 3a-b yet another embodiment of a linear motor is shown. This embodiment is also similar to the embodiment of FIGS. 1a-c and the differences will be illustrated below.

The stator 12 may be identical to the one in FIGS. 1a-c. However, the mover 14 may be a soft magnetic tube 32a-d in which sections of the soft magnetic tube 32a-d are replaced with permanent magnet rings 34a-c. The permanent magnet rings are arranged in the soft magnetic tube so that the polarization vectors of the permanent magnets are directed axially. A more detailed description of this type of mover will be presented below.

In the embodiments of FIGS. 1a-c, 2a-b, and 3a-b a stator having three stator cores and three coils is described. However, the number of stator cores and coils may be larger or lesser. The stator of FIGS. 1a-c may, for example, be extended with an additional stator core and with a corresponding stator coil. Further, the number of stator coils may be decreased by removing stator cores 20a-c and corresponding stator coils from the linear motor in FIGS. 1a-c, 2a-b, and 3a-b.

Figure 4B:
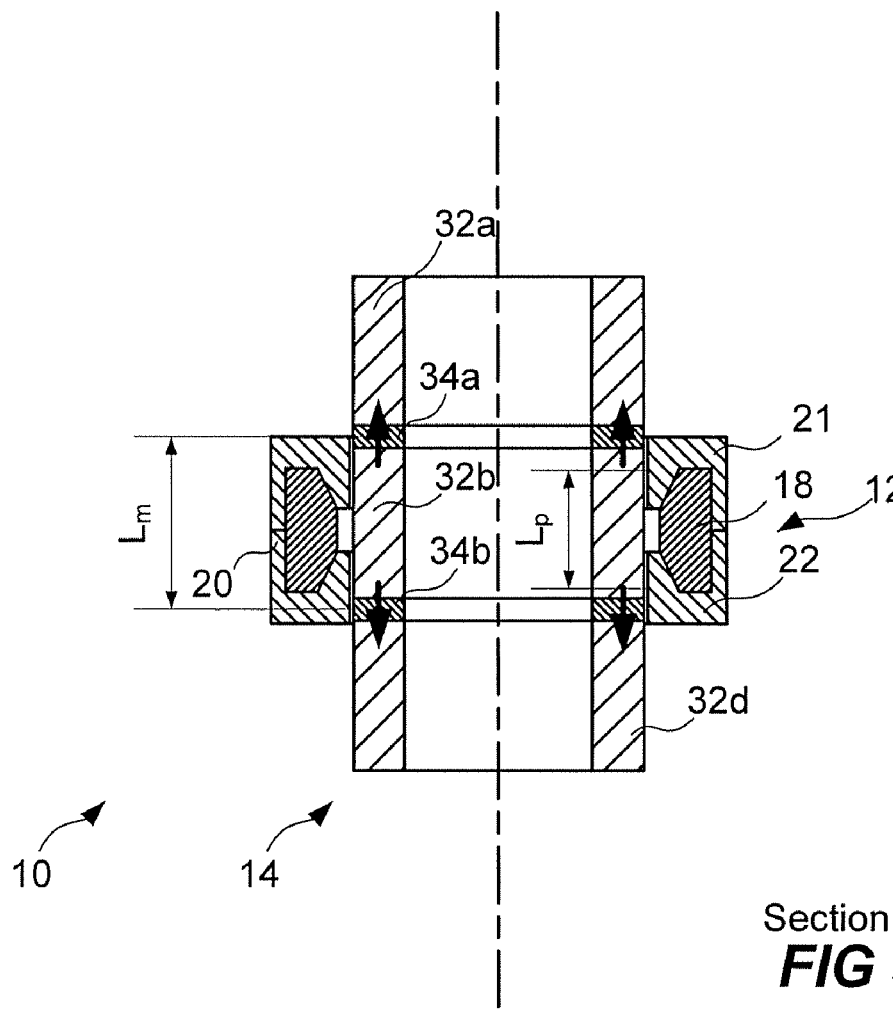
FIG. 4b is a cross-sectional view along line A-A in FIG. 4a, FIG. 5 is a perspective view of a stator core including two stator parts according to one embodiment of the invention.
Figure 4A:
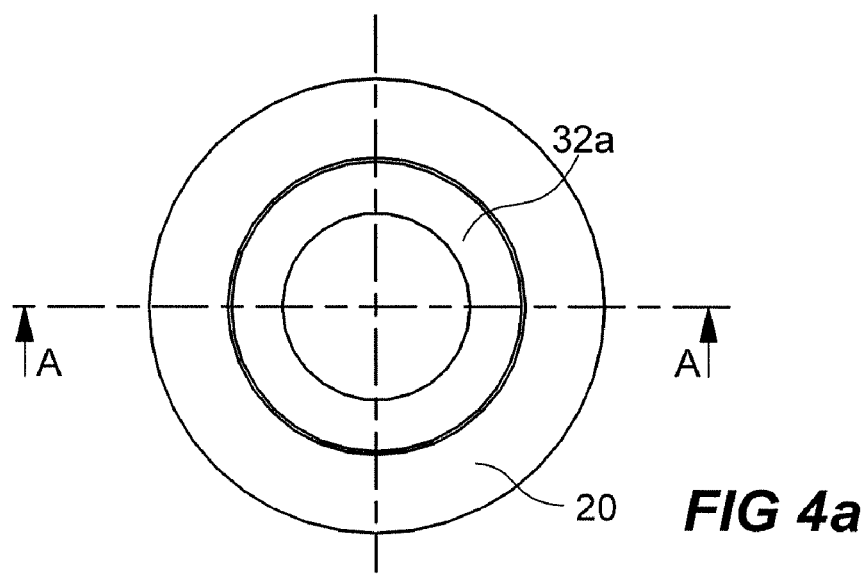

In FIGS. 4a-b, a linear motor having one stator coil 18 and one stator core 20 is shown. The mover in the figure is a mover corresponding to the mover of the linear motor showed in FIGS. 3a-b, which will described in more detail below. However, the mover may be of any type, e.g. one of the movers showed in FIGS. 1a-c and 2a-b.

Figure 5:
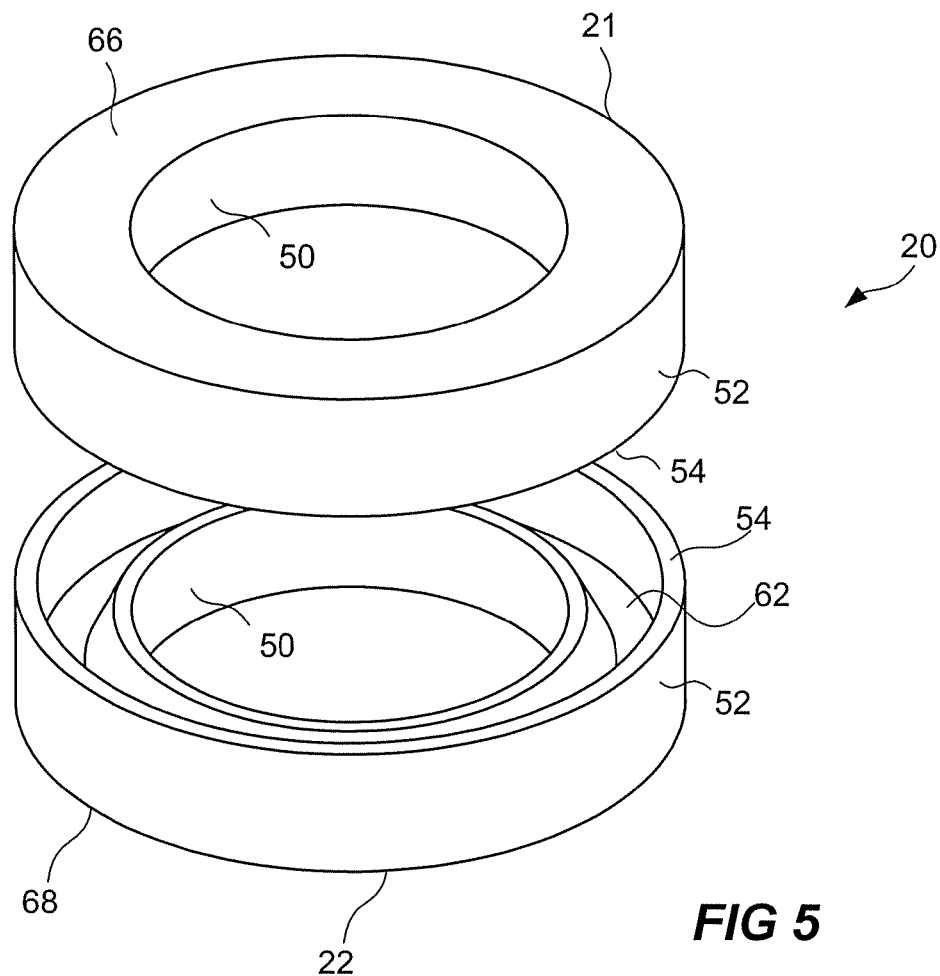
Figure 6:
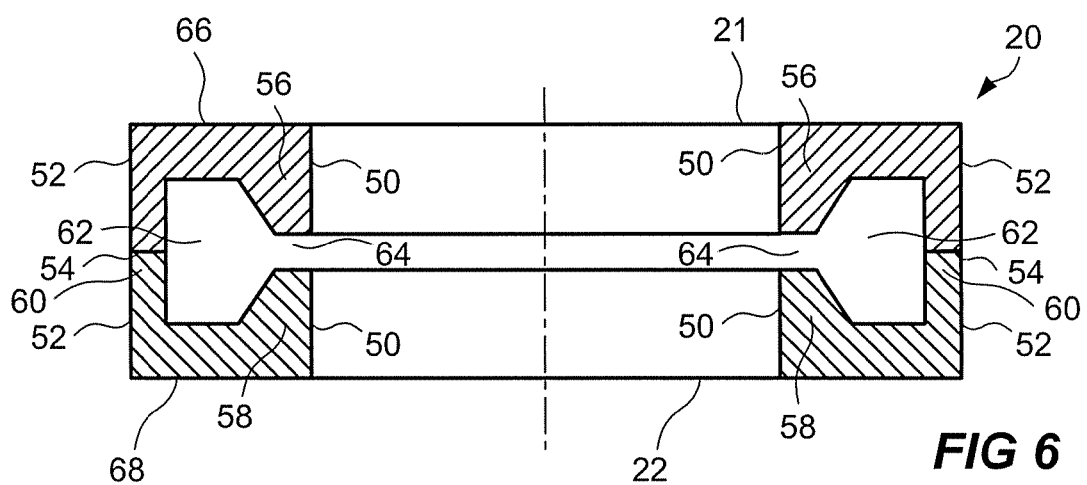
FIG. 6 is a cross-sectional view of a stator core corresponding to the stator core of FIG. 5, FIGS. 7a-c are cross-sectional views of stator cores according to embodiments of the invention showing further examples of the division of a stator core into two separate stator parts.

In FIGS. 5 and 6 there is shown a stator core 20 according to one embodiment. As mentioned above the stator core 20 is divided into two separate stator parts, a first stator part 21 and a second stator part 22. The stator core 20 has an inner perimeter 50, an outer perimeter 52, and a splitting plane 54. The inner perimeter should be understood as a line that defines an inner boundary of the stator core 20 and the outer perimeter should be understood as a line that defines an outer boundary of the stator core 20. This stator core may also be described as having the shape of a circular ring. In the figure the outer perimeter 52 encircles the inner perimeter 50, however, the stator core 20 may include gaps extending radially through the stator core 20 and still be thought of as having an outer perimeter encircling an inner perimeter, at least essentially encircling an inner perimeter. The splitting plane 54 is the plane resulting from dividing the stator core into two stator parts 21, 22.

Further, the stator core 20 includes at least two teeth, a first tooth 56 and a second tooth 58, and a back core 60. The teeth 56 and 58 are arranged alone the inner perimeter 50 in order to lead magnetic flux towards and from the vicinity of the mover. The back core 60 is arranged along the outer perimeter 52 in order to provide a high permeance flux path between the first tooth 56 and the second tooth 58. In the embodiment shown in FIGS. 5 and 6 each stator part 21 and 22 includes one tooth 56,58 each and a portion of the back core 60.

A slot 62, in the form of a cavity, is arranged inside the stator core 20 for receiving the stator coil. The slot is, thus, arranged between the outer perimeter 52 and the inner perimeter and is partially defined by the first stator part 21 and partially by the second stator part 22. Accordingly, the slot 62 also has the shape of a circular ring.

The teeth 56 and 68 of the stator core 20 extends in an axial direction towards each other leaving a slot opening 64 between them. The slot opening 64 is leading into the slot 62 in the stator core 20.

The stator parts 21 and 22, and, thus, the stator core 20, may be made of soft magnetic material having the characteristics mentioned above in connection with FIGS. 1a-c.

The splitting plane 54 of the stator core 20 maybe arranged at an equal axial distance from a first surface 66 of the stator core facing axially and a second surface 68 of the stator core facing axially in the opposite direction. If the teeth 56 and 58 extends axially along the inner perimeter by the same axial distance and the splitting plane 54 is arranged as previously mentioned the two stator parts are identical and one set of manufacturing tools may be used to produce them. Accordingly, the initial cost of producing a stator may be reduced in relation to a stator requiring two different sets of tools for producing the different stator parts 21 and 22.

Figure 7A:
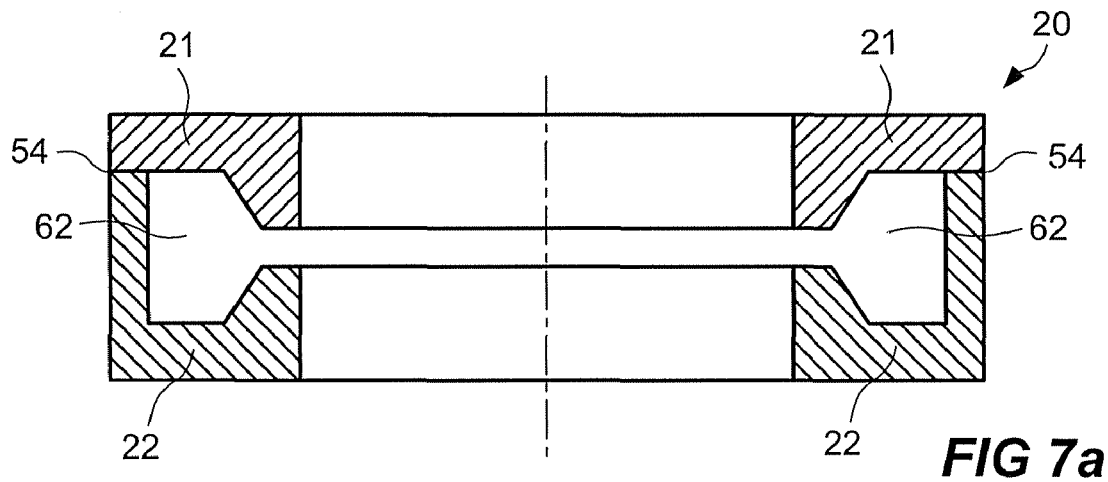
Figure 7B:
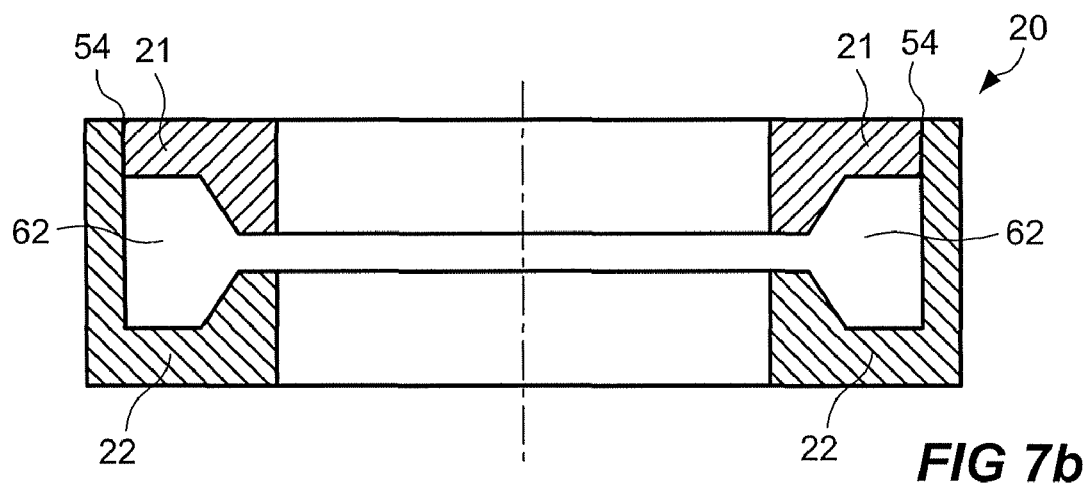
Figure 7C:
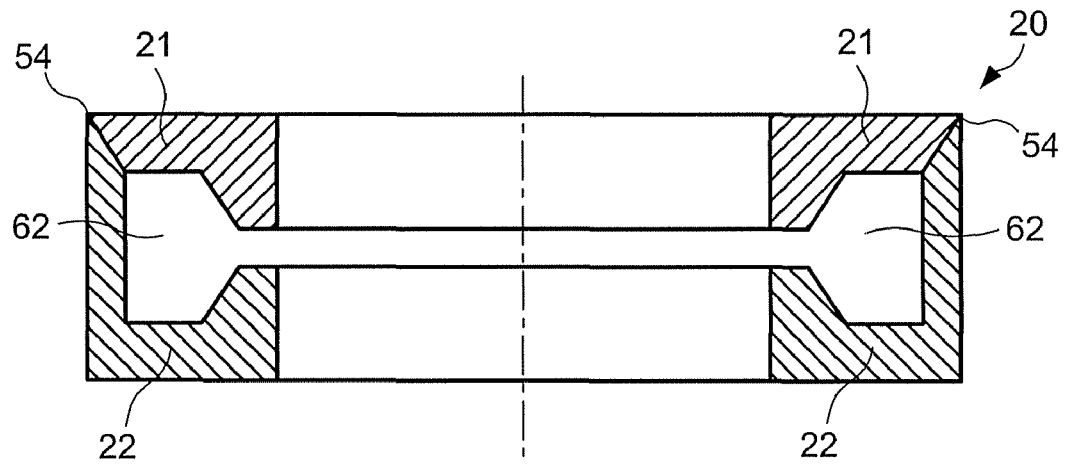

However, the splitting plane 54 may be positioned differently than in FIGS. 5 and 6. Some other ways of splitting the stator core 20 into a first stator part 21 and a second stator part 22 are shown in FIGS. 7a-c. These figures do not intend to present the complete picture of possible variants of splitting the stator core. One reason for dividing the stator core 20 into at least two stator parts 21 and 22 may be to facilitate the act of providing the slot 62 of the stator 20 with a coil. By splitting the stator 20 as described above a pre-wound coil may be used and the production of a stator core having a coil arranged in its slot may be as easy as putting the pre-wound coil into one of the stator parts 21 or 22 and then completing the stator by putting the other stator part 21 or 22 in close contact with the initial stator part 21 or 22.

Figure 8:
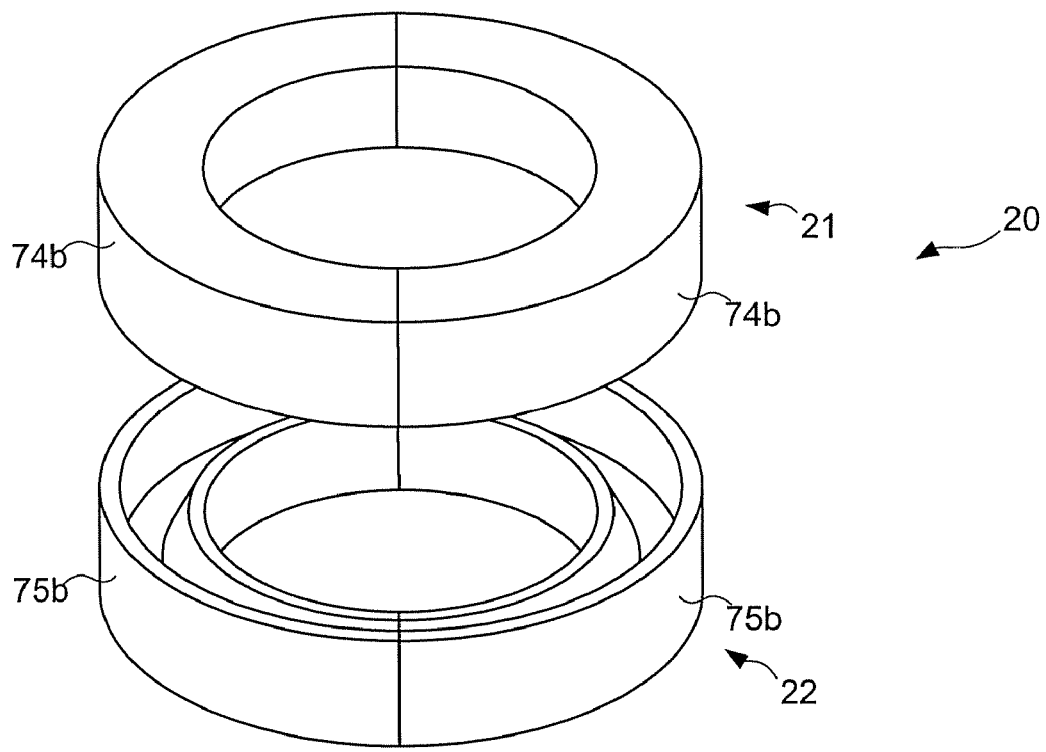
FIGS. 8-9 are perspective views of stator parts being divided into sections according to one embodiment of the invention.
Figure 9:
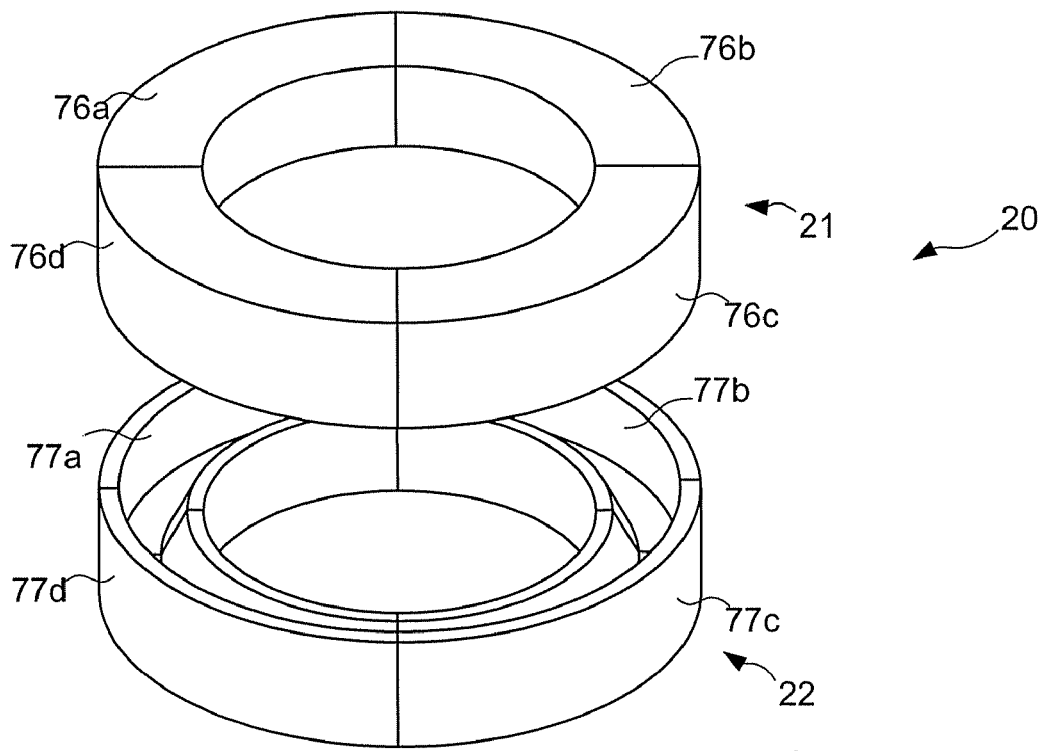

In FIGS. 8-9 there are presented embodiments in which the stator parts 21, 22 are divided into a few sections 74a-b, 75a-b, 76a-d, and 77a-d, arranged adjacently in a direction corresponding to the direction of the inner and the outer perimeter. There may be advantages in dividing the stator parts like this, at least when large stators are to be manufactured.

Figure 10:
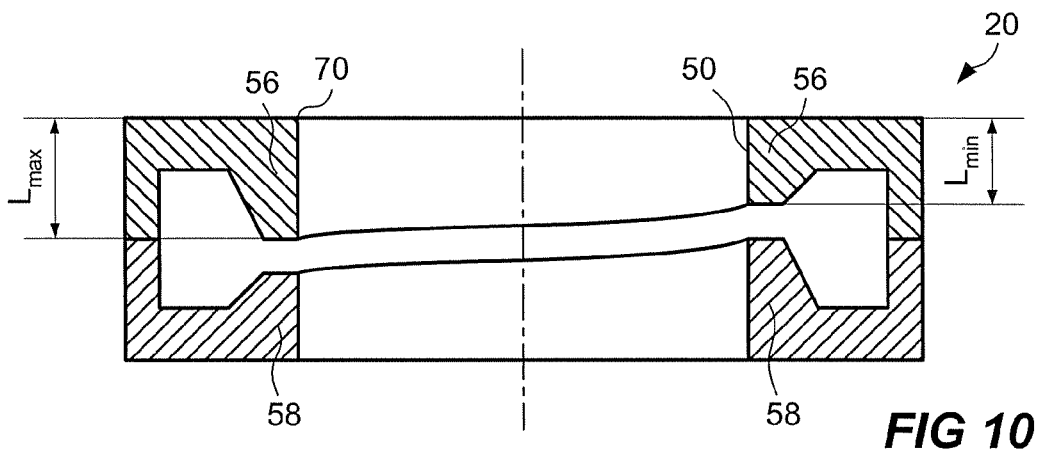
FIG. 10 is a cross-sectional view of a stator core according to one embodiment of the invention illustrating an example of a design that may introduce an effect similar to skew.

In FIG. 10 another embodiment of a stator core 20 is shown. This, embodiment may be based on any one of the previously described stator core embodiments. In this embodiment the axial length along the inner perimeter surface 50 of each stator tooth 56 and 58 may vary. In the figure this axial length of the teeth 56, 58 vary from a length $L_{max}$ to a length $L_{min}$ and back again to $L_{max}$ when studying the axial length of the teeth 56, 58 along the circumferential length of the inner perimeter 70. The variation may be linear. The slot opening 64 may extend the same axial distance independently of the position along the inner perimeter 70, this may be achieved by arranging the stator parts so that the axial extension of the tooth of one stator part is $L_{max}$ at the same position at the perimeter as the axial extension of the other tooth is $L_{min}$.

Figure 11:
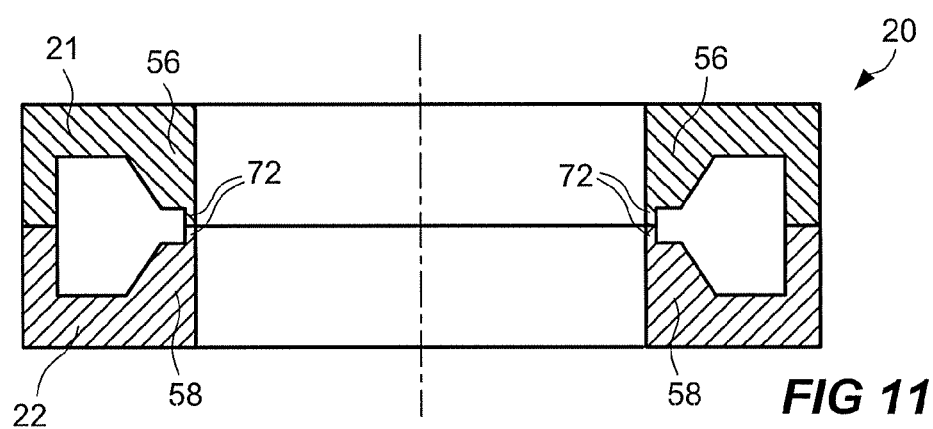
FIG. 11 is a cross-sectional view of a stator core according to one embodiment of the invention illustrating an example in which the teeth are designed to be in contact with each other.

The introduction of this variable axial length of the teeth resembles skew introduced in rotational motors. Skew, when used in connection with rotational motors, denote an angular "twist" of a slot away from the axial direction by an electrical angle. In most cases the skew is a feature of the rotor, see M. G. Say, "Alternating Current Machines", 5th ed., Longman Scientific Technical, 1983, (ISBN 0-5.82-98875-6), page 106. Accordingly, by introducing said variable axial length of the teeth 56 and 58, force ripple of the linear motor may be reduced in FIG. 11 another embodiment of a stator core 20 is shown. This, embodiment may be based on any one of the previously described stator core embodiments. In this embodiment the axial length of the teeth 56, and 58 are extended so that the teeth 56 and 58 come into contact with each other. The extended portion is narrow in the radial direction, in relation to the rest of a tooth 56 or 58, thus resulting in a protrusion 72. The protrusion 72 should be so narrow in the radial direction that the protrusion 72 reaches flux saturation and, thus, presents a small amount of leakage flux flowing via the path of the protrusion 72. Additionally, the protrusion 72 may be so wide in the radial direction that the protrusion may serve as a complementing support when it comes to arranging the two stator parts 21 and 22 in close connection with each other.

In order to make a linear motor having a single stator coil, e.g. the one shown in FIGS. 4a-b, any one of the above described stator cores may be used. In order to make a linear motor having a plurality of stator coils, e.g. the ones showed in FIGS. 1a-c, 2a-b, and 3a-b, a plurality of the above mentioned stator cores may be arranged adjacent to each other. In such stators, i.e. stators in which said stator cores are arranged adjacent to each other, the adjacent teeth of two adjacent stator cores may be seen as, from a magnetic flux point of view, one single tooth. Thus, the center of this "magnetic" tooth should be used when determining the pitch of such stators. In such designs the magnetic tooth including soft magnetic material from two different stator cores may be called a full tooth and each of the magnetic teeth at each end of the stator, only including soft magnetic material from one stator core, may be called a half tooth. Additionally, a stator 12 for a linear motor having a plurality of coils may also be designed as showed in FIG. 12.

Figure 12:
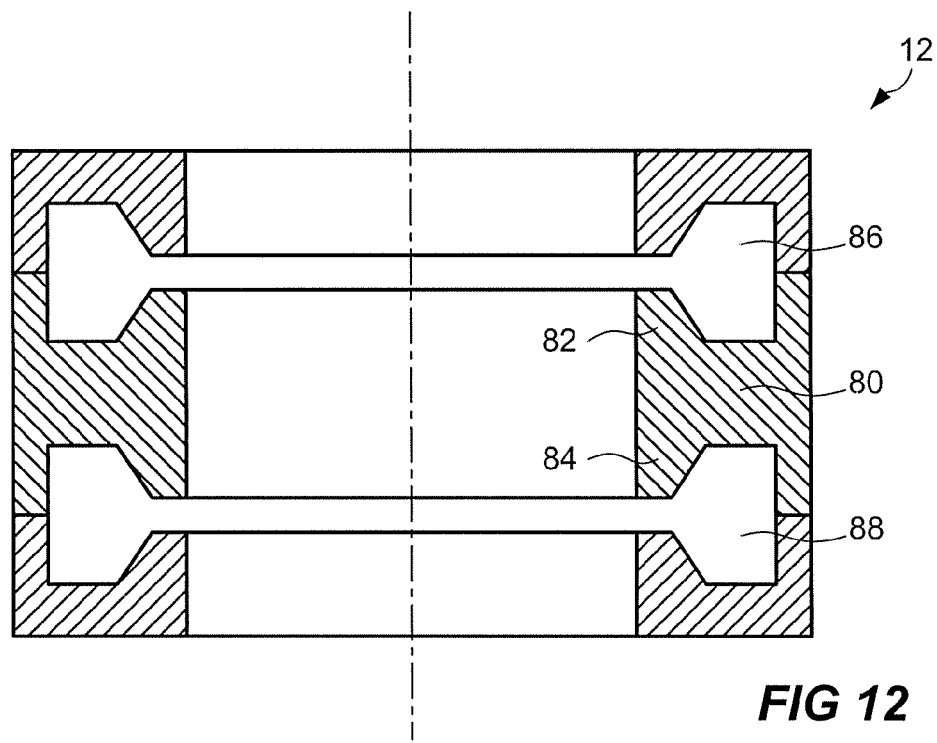
FIG. 12 is a cross-sectional view of a stator core for two stator coils according to one embodiment of the invention.

The FIG. 12 is a schematic view of an embodiment of a stator 12 for two stator coils, not shown. The difference between a stator including stator cores as the ones described above, wherein the stator cores are separate and arranged adjacent to one another, is that this embodiment includes a middle part 80. The middle part 80 is made in one piece and includes a tooth 82 that corresponds to the second tooth 58 of the single stator core described in FIG. 6 and a tooth 84 that corresponds to the first tooth 56 of another single stator core arranged in close contact with the first one. Thus, said middle part 80 partly define a first stator slot 86 and partly define a second stator slot 88. This middle part 80 may also be used in order to make stators 12 including a greater number of stator coils than two.

Figure 13A:
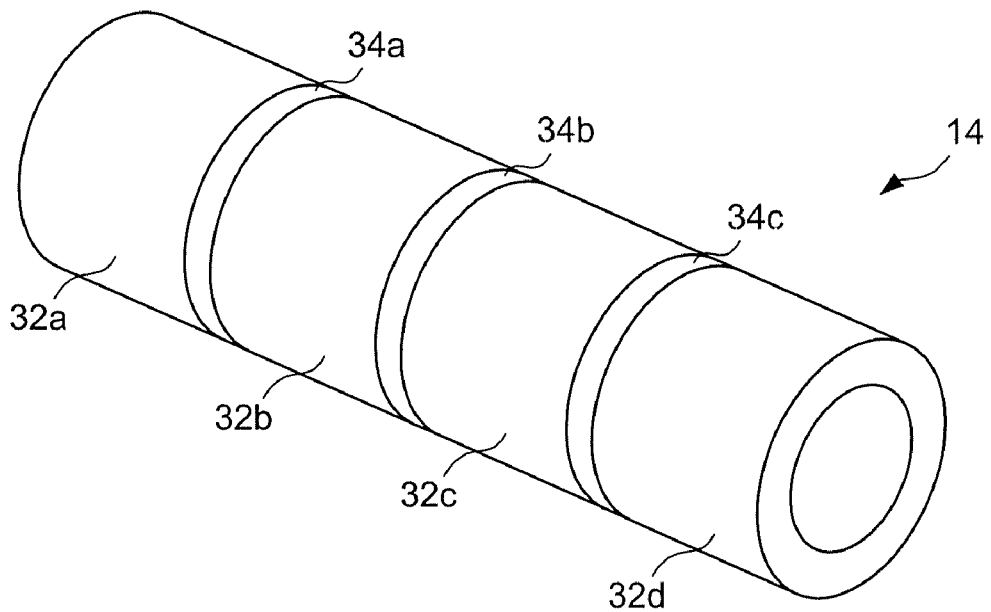
FIG. 13a is a perspective view of a mover according to one embodiment of the invention.
Figure 13C:
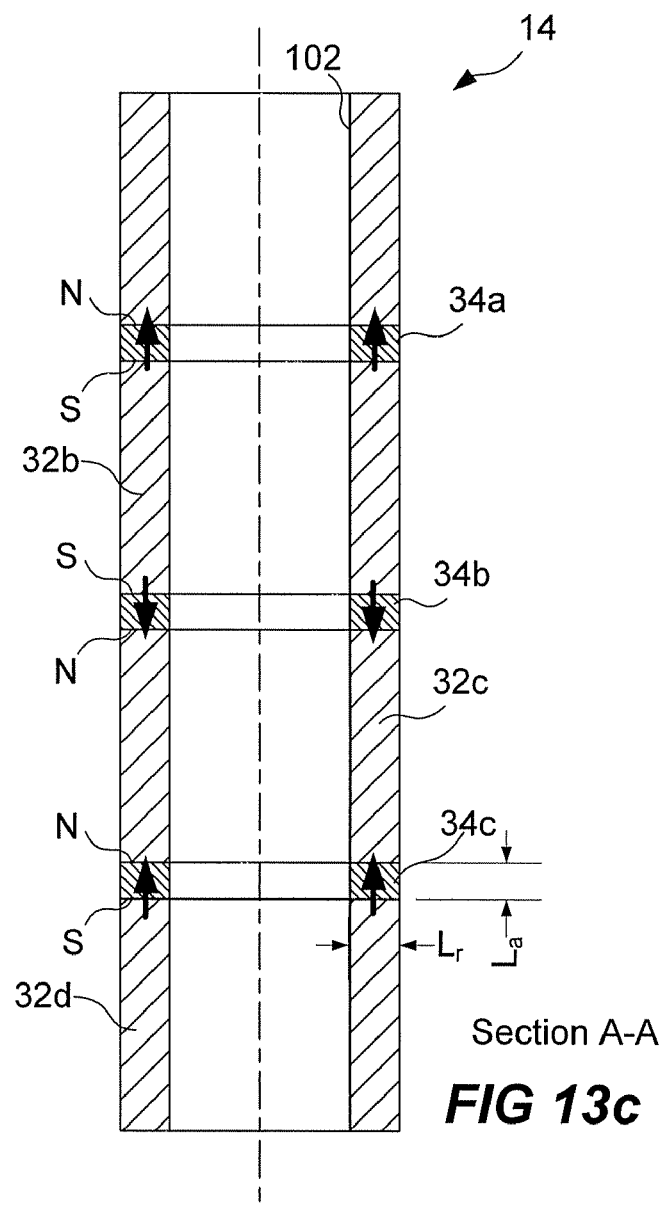
FIG. 13b is a view in an axial direction of the linear motor of FIG. 13a, FIG. 13c is a cross-sectional view along line A-A in FIG. 13b of the mover of FIG. 13a, FIG. 13d is a detail view of an embodiment of the mover of FIG. 13a, FIG. 14 is a perspective view of a stator core according to one embodiment of the invention.
Figure 13B:
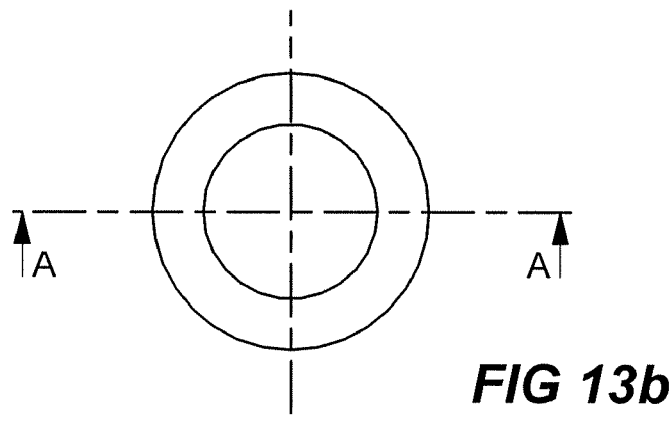
Figure 13D:
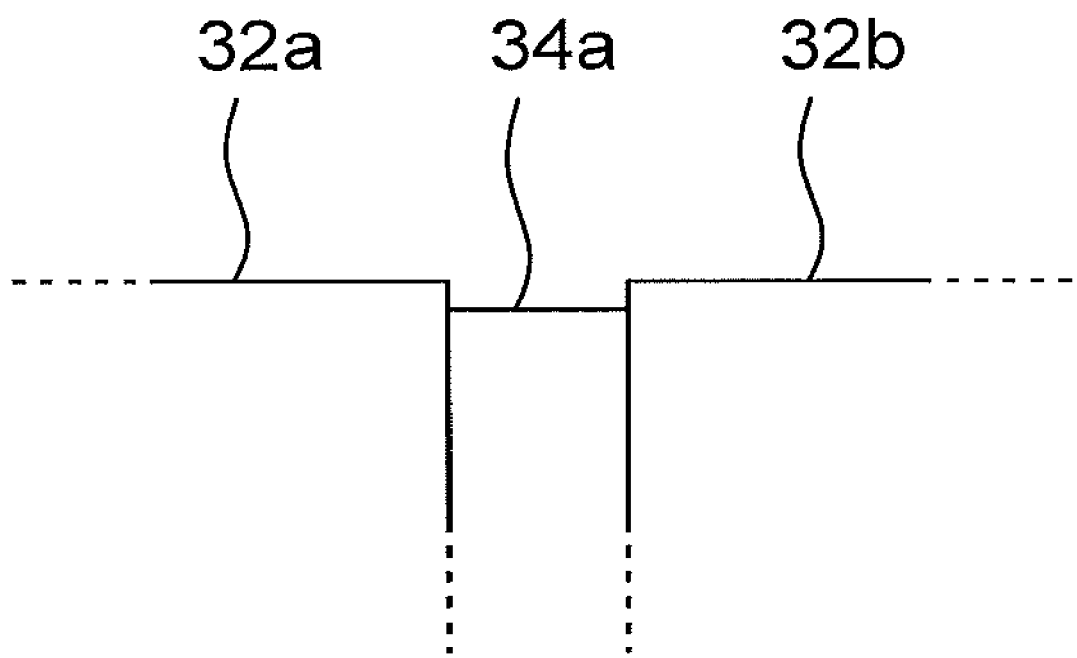

In FIG. 13a-c a mover 14 corresponding to one embodiment of the mover illustrated in the linear motor in FIGS. 3a-b is shown. The mover may comprise soft magnetic sections 32a-d of soft magnetic material, i.e. one of the materials described in connection with FIGS. 1a-c, and permanent magnet sections 34a-c. The permanent magnet sections 34a-c may extend essentially from an inner surface 102 of the mover 14 to an outer surface 104 and continuous along the circumference of the mover 14. In order to transfer magnetic flux to the soft magnetic sections 32a-d, the permanent magnet sections 34a-c, may be arranged in close contact with the soft magnetic sections 32a-d. The permanent magnet sections 34a-c should not extend past the surface of the mover that are facing the stator. Also, they do not need to be arranged flush to said surface facing the stator, but may end just before they reach said surface. As shown in the detail view of FIG. 13d, in the axial direction the permanent magnet, shown as permanent magnet section 34a, may be shorter than the soft magnetic sections 32a-d, shown as soft magnetic sections 32a and 32b.

The permanent magnets 34a-c are arranged with their poles N and S facing in an axial direction. Also, the permanent magnet sections 34a-c are arranged so that a north pole N of a permanent magnet section, e.g. permanent magnet section 34b, is facing a north pole N of an adjacent permanent magnet section, e.g. permanent magnet section 34c. Accordingly the south pole S of a permanent magnet section is facing a south pole of an adjacent permanent magnet section, e.g. permanent magnet sections 34a and 34b. This results in that the soft magnetic sections 32a-d may act as magnets with a radially directed polarization vector.

Further, the permanent magnets may be made shorter in the axial direction, i.e. the ratio between the axial length and the radial length, from the inner surface to the outer surface of the mover, of the magnet, $L_a/L_r$, may be lesser than the corresponding ratio for the permanent magnets in the movers of the linear motors in FIGS. 1a-c and 2a-b. Accordingly, the manufacturing of the permanent magnets is facilitated, because it is easier to manufacture permanent magnets that has a lesser $L_a/L_r$ value. The mover also becomes more robust when designed like this.

However, the mover may also be a tube in which groves are arranged to accommodate the magnets. In such an embodiment the grooves may be arranged to face a stator and a portion of the magnet accommodated in the grove and facing away from the stator is, thus, facing the material of the tube. Other features of such a mover may at least correspond to the features of the other embodiments of the mover.

According to one embodiment the mover for a linear motor may comprise at least one section of soft magnetic material and at least one permanent magnet, said at least one section of soft magnetic material and said at least one permanent magnet being aligned in an axial direction of the mover, wherein a polarization vector of said at least one permanent magnet is directed axially.

Further, said section of the mover above made of soft magnetic material may be made of soft magnetic powder.

According to another embodiment the mover may comprise at least two permanent magnets, a first permanent magnet and a second permanent magnet, that are aligned in said axial direction and wherein the distance between the axial center of said at least two permanent magnets is 0.75-1.5 times the pitch of a prospective stator.

In addition to the previous embodiment the permanent magnets may be arranged so that no other permanent magnet is arranged closer to the first permanent magnet than the second permanent magnet.

According to yet another embodiment the mover may be tubular.

According to a further embodiment said at least one section of soft magnetic material is provided with at least a first axial end having an end surface and wherein said at least one permanent magnet is arranged in contact with essentially the entire end surface of said first axial end.

According to another embodiment, a circumferentially and axially extending surface of said at least one permanent magnet is arranged essentially flush with a circumferentially and axially extending surface of the mover that is arranged to face an intended stator.

According to one embodiment, a linear motor as described in any of the embodiments in this document may comprise a mover according to any one of the mover embodiments described above.

Figure 14:
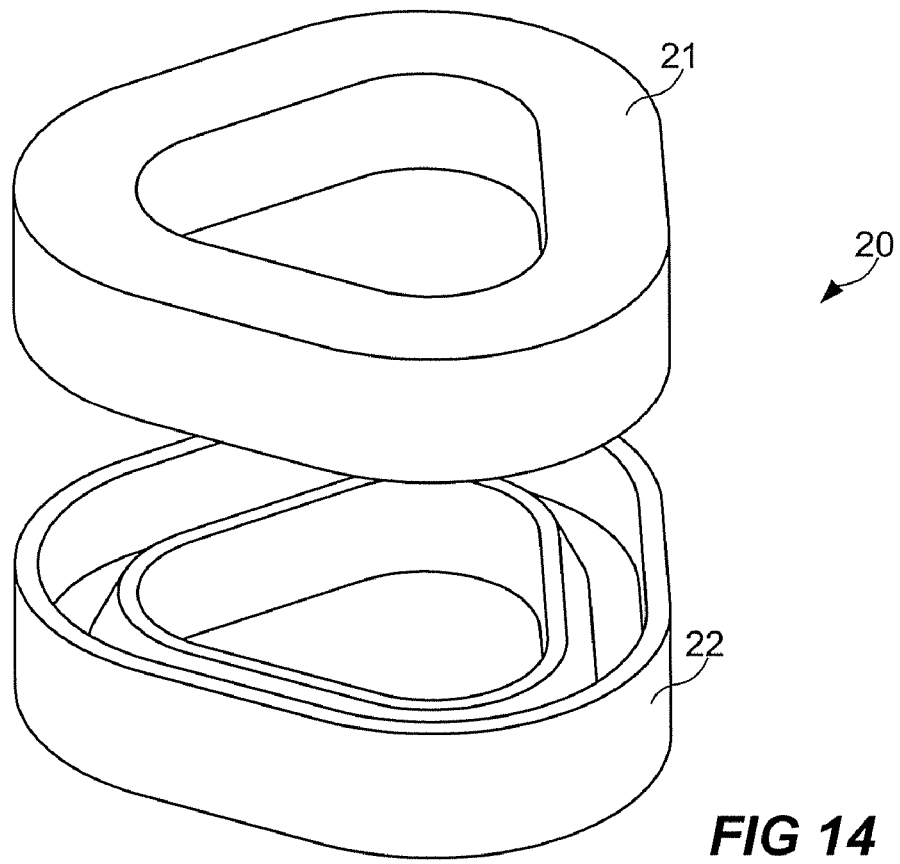

The shape of a radial section of the stator 12 and the mover 14 do not have to be circular. In some applications another shape of the radial section may be more optimal. In FIG. 14 there is shown an triangular stator core 20 including two stator parts 21 and 22. The stator core may also be described as a ring having a triangular shape. This stator core 20 may be made and/or arranged in the same way as in any one of the above mentioned stators. The stator coil that is to be arranged in the stator core may be pre-wound independently of the shape of the radial section. A mover in a linear motor provided with said triangular stator core may also has to be formed into this triangular shape for best performance. The shape of the radial section of the stator and/or the mover may take almost any form. For example, they could be oval, rectangular, star-shaped, shaped as two circles joined together, i.e. shaped as the digit eight, etc, the possibilities are endless. The manufacturing of stators and movers of odd and normally difficult shapes may be facilitated by the fact that the stators and movers may be formed by means of soft magnetic powder or an moldable material having at least the characteristics of good magnetic flux permeability and resistance for electric currents, as mentioned above.

Figure 15B:
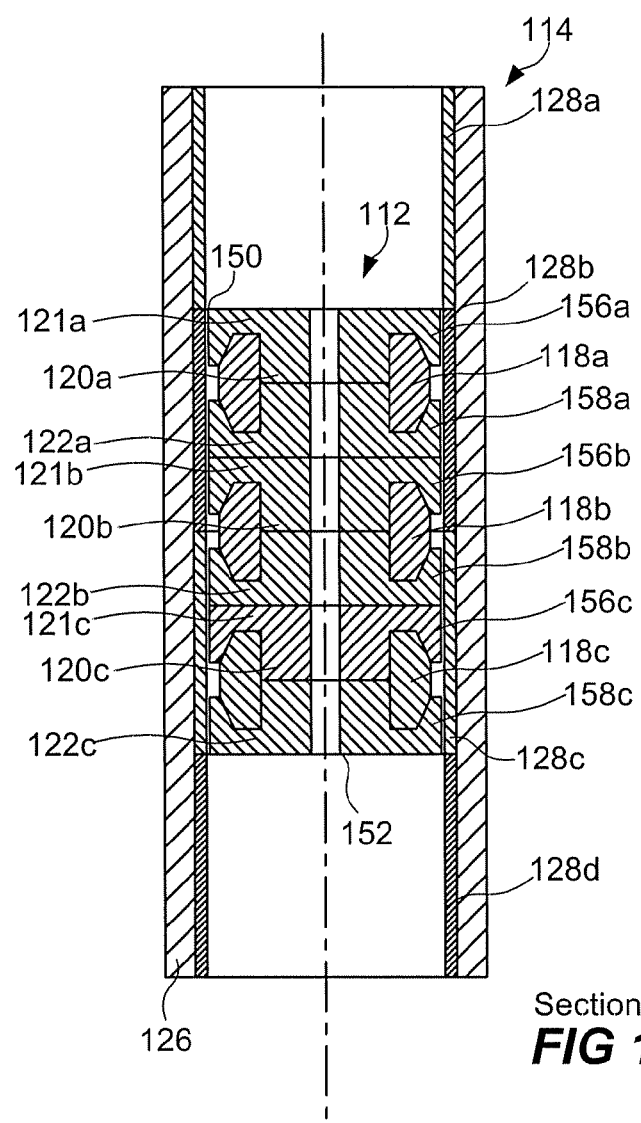
Figure 15A:
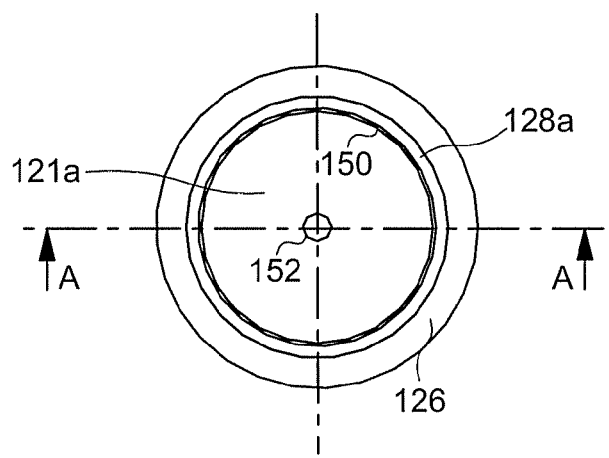
FIG. 15a is a view in an axial direction of a linear motor and a stator core according to another embodiment of the invention.

In FIGS. 15a-b another embodiment of the linear motor is shown. This embodiment of the linear motor comprises a stator 112 and a mover 114, just like the linear motors described in connection with FIGS. 1a-c, 2a-b, and 3a-b. However, in this embodiment the stator 112 is positioned within the mover 114, i.e. the mover 114 essentially encircles the stator 112. The stator 112 may include a plurality of stator coils, the embodiment in the figure includes three stator coils 118a-c. However, this type of linear motor may also be arranged with only one stator coil.

The stator cores 120a-c of the stator 112 may also be divided into a first stator part 121a-c and a second stator part 122a-c in a similar way as the outer stator cores described above. One great difference between the stators of the linear motors in FIGS. 1-3 and the linear motor of this embodiment is that the teeth 156a-c and 158a-c of the stator cores 120a-c are arranged along an outer perimeter 150 of the stator 112 in order to enable magnetic interaction with the mover 114.

Further, the stator cores 120a-c may be designed in a similar way as the outer stator cores described above, with the structural differences required for enabling magnetic interaction with an outer mover 114 instead of an inner mover. Thus, they may be designed with varying axial tooth length similar to the embodiment in FIG. 10 and with tooth protrusions similar to the protrusions in the embodiment in FIG. 11.

Accordingly, the previously described features of outer stator cores is applicable to these inner stator cores 120*a-c*.

In the embodiment showed, the stator 112 includes an inner perimeter 152 defining an axial hole in the center of the stator cores 120*a-c*. In another embodiment this hole may not be present, i.e. the center of each stator core 120*a-c* may be a solid of the same soft magnetic material as the rest of the stator core.

The mover 114 is formed in a similar way to the mover in FIGS. 1*a-c*, with the difference that the permanent magnets 128*a-d* are arranged on the inside of a soft magnetic tube 126. The mover 114 may also be of the type described in FIGS. 13*a-b*, such a mover may be used without any changes in the design.

The invention claimed is:

1. Mover for a linear motor, said mover comprising at least one section of soft magnetic material and at least one permanent magnet, said at least one section of soft magnetic material and said at least one permanent magnet being aligned in an axial direction of the mover, wherein a polarization vector of said at least one permanent magnet is directed axially, wherein said section made of soft magnetic material is made of soft magnetic powder and the mover is tubular, and wherein a radial dimension of said at least one section of soft magnetic material is larger than a radial dimension of said at least one permanent magnet.

2. Mover according to claim 1, wherein said at least one section of soft magnetic material is provided with at least a first axial end having an end surface and said at least one permanent magnet is provided with at least a first axial end having an end surface which is arranged in contact with the end surface of said first axial end of said at least one section of soft magnetic material.

3. Mover according to claim 1, wherein the mover comprises at least two permanent magnets, a first permanent magnet and a second permanent magnet, that are aligned in said axial direction and wherein the distance between the axial center of said at least two permanent magnets is 0.75 to 1.5 times the pitch of a prospective stator.

4. Mover according to claim 3, wherein no other permanent magnet is arranged closer to the first permanent magnet than the second permanent magnet.

5. Mover according to claim 1, wherein said at least one section of soft magnetic material presents a resistivity of at least 1 μΩm.

6. Mover according to claim 1, wherein said at least one section of soft magnetic material presents a density of at least 6500 kg/m$^3$.

7. Mover according to claim 1, comprising at least two sections of soft magnetic material, a first and a second section, wherein the at least one permanent magnet is arranged between the first and the second section of soft magnetic material.

8. Mover according to claim 1, comprising at least three sections of soft magnetic material, a first, second and third section, and at least two permanent magnets, a first and second permanent magnet, wherein the first permanent magnet is arranged between the first and second section of soft magnetic material and the second permanent magnet is arranged between the second section and the third section of soft magnetic material.

9. Mover according to claim 1, wherein an axial and circumferentially extending surface of the at least one section of soft magnetic material and an axial and circumferentially extending surface of the at least one permanent magnet are arranged non-flush.

10. Mover according to claim 1, wherein a shape of a radial cross section of the mover is triangular, oval, rectangular or star-shaped.

* * * * *